(12) United States Patent
Wang et al.

(10) Patent No.: US 12,499,552 B2
(45) Date of Patent: Dec. 16, 2025

(54) IMAGE PROCESSING APPARATUS, IMAGE PROCESSING METHOD, AND RECORDING MEDIUM

(71) Applicant: CANON MEDICAL SYSTEMS CORPORATION, Tochigi (JP)

(72) Inventors: Yanhua Wang, Beijing (CN); Fuyue Wang, Beijing (CN); Qilin Xiao, Beijing (CN); Zhexin Zhou, Beijing (CN)

(73) Assignee: CANON MEDICAL SYSTEMS CORPORATION, Tochigi (JP)

( * ) Notice: Subject to any disclaimer, the term of this patent is extended or adjusted under 35 U.S.C. 154(b) by 363 days.

(21) Appl. No.: 18/154,121

(22) Filed: Jan. 13, 2023

(65) Prior Publication Data
US 2023/0222668 A1   Jul. 13, 2023

(30) Foreign Application Priority Data

Jan. 13, 2022   (CN) .......................... 202210037888.0
Nov. 11, 2022   (JP) ................................ 2022-180755

(51) Int. Cl.
*G06T 7/11* (2017.01)
*G06T 7/136* (2017.01)
(Continued)

(52) U.S. Cl.
CPC ................ *G06T 7/11* (2017.01); *G06T 7/136* (2017.01); *G06T 7/143* (2017.01); *G06T 7/187* (2017.01);
(Continued)

(58) Field of Classification Search
CPC . G06T 7/11; G06T 7/136; G06T 7/143; G06T 7/187; G06T 2207/20076;
(Continued)

(56) References Cited

U.S. PATENT DOCUMENTS 9,811,912 B2   11/2017   Wu et al.
2009/0016588 A1*   1/2009   Slabaugh ............. G06V 10/267
                                                              382/131
(Continued)

FOREIGN PATENT DOCUMENTS

CN   111696089 A   9/2020
JP   2014-223311 A   12/2014

OTHER PUBLICATIONS

Nardelli et al. Pulmonary artery-vein classification in CT images using deep learning. IEEE transactions on medical imaging 37.11 (2018): 2428-2440. (Year: 2018).*
(Continued)

*Primary Examiner* — Katrina R Fujita
(74) *Attorney, Agent, or Firm* — Oblon, McClelland, Maier & Neustadt, L.L.P.

(57) ABSTRACT

An image processing apparatus according to an embodiment of the present disclosure includes processing circuitry. The processing circuitry is configured to obtain volume data of a subject. The processing circuitry is configured to obtain base tubular object data by segmenting the volume data. The processing circuitry is configured to obtain small tubular object data from the volume data. The processing circuitry is configured to generate updated base tubular object data, on the basis of the small tubular object data and the base tubular object data. The processing circuitry is configured to output the updated base tubular object data.

14 Claims, 12 Drawing Sheets

(51) Int. Cl.
*G06T 7/143* (2017.01)
*G06T 7/187* (2017.01)

(52) U.S. Cl.
CPC ............... *G06T 2207/20076* (2013.01); *G06T 2207/20081* (2013.01); *G06T 2207/20092* (2013.01); *G06T 2207/30061* (2013.01); *G06T 2207/30101* (2013.01); *G06T 2207/30172* (2013.01)

(58) Field of Classification Search
CPC . G06T 2207/20081; G06T 2207/20092; G06T 2207/30061; G06T 2207/30101; G06T 2207/30172
See application file for complete search history.

(56) References Cited

U.S. PATENT DOCUMENTS

| | | | |
|---|---|---|---|
| 2010/0128940 A1* | 5/2010 | Buelow | G06T 7/155 |
| | | | 382/128 |
| 2010/0159497 A1* | 6/2010 | Kimia | G06T 7/44 |
| | | | 435/29 |
| 2010/0296709 A1* | 11/2010 | Ostrovsky-Berman | |
| | | | G06T 7/162 |
| | | | 382/128 |
| 2014/0341426 A1 | 11/2014 | Wu et al. | |
| 2017/0258433 A1* | 9/2017 | Gulsun | A61B 6/5217 |
| 2023/0104173 A1* | 4/2023 | Guo | G06V 10/764 |
| | | | 382/128 |

OTHER PUBLICATIONS

Bhuiyan et al. "Automatic detection of vascular bifurcations and crossovers from color retinal fundus images." 2007 Third International IEEE Conference on Signal-Image Technologies and Internet-Based System. IEEE, 2007. (Year: 2007).*

Wang et al. "Multi-task siamese network for retinal artery/vein separation via deep convolution along vessel." IEEE Transactions on Medical Imaging 39.9 (2020): 2904-2919. (Year: 2020).*

Chinese Office Action issued Jun. 11, 2025, in Patent Application No. 202210037888.0, 5 pages.

* cited by examiner

FIG.3

| FEATURE VALUES | $\lambda_1$ | $\lambda_2$ | $\lambda_3$ |
|---|---|---|---|
| | L | L | H₋ |
| | L | L | H₊ |
| | L | H₋ | H₋ |
| | L | H₊ | H₊ |
| | H₋ | H₋ | H₋ |
| | H₊ | H₊ | H₊ |

3D

FIG.6
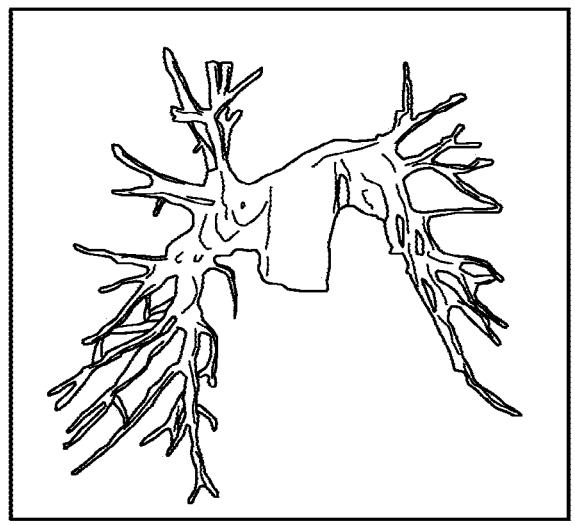
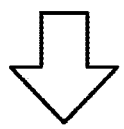
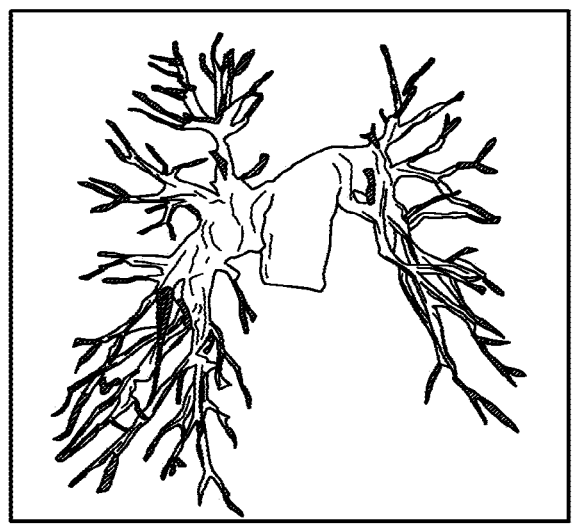

FIG.7
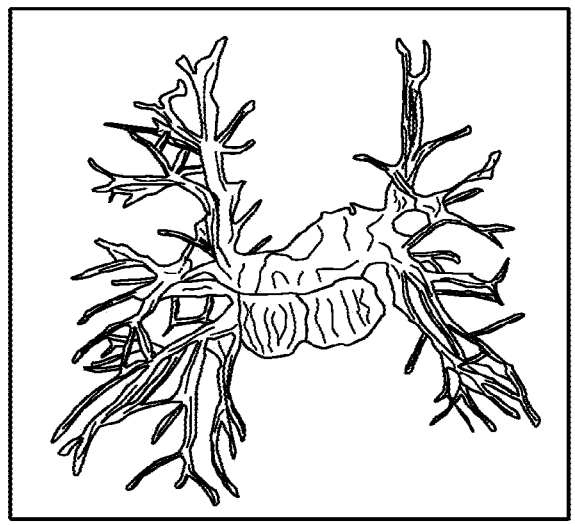
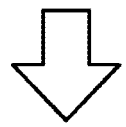
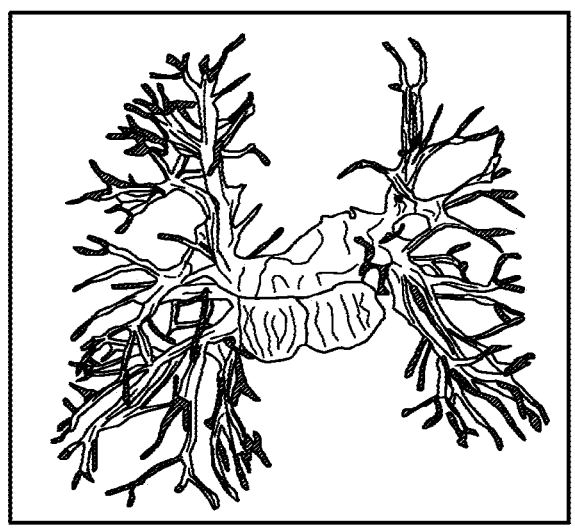

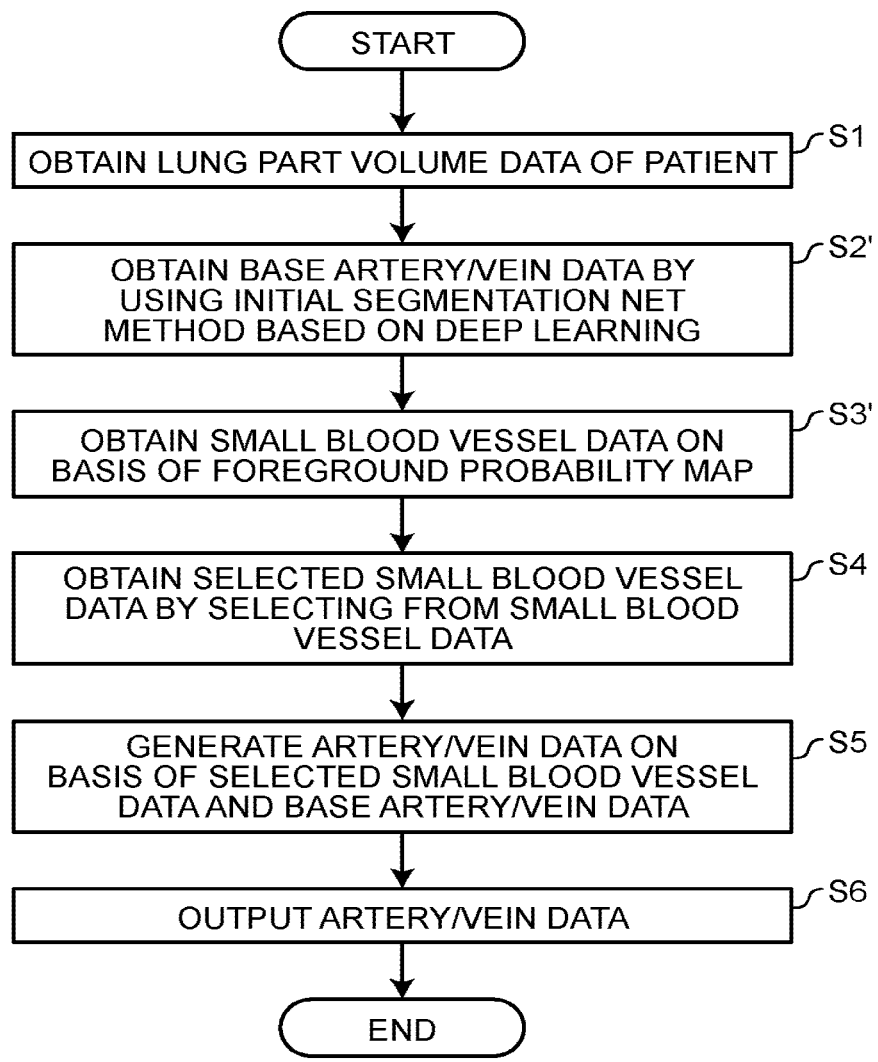

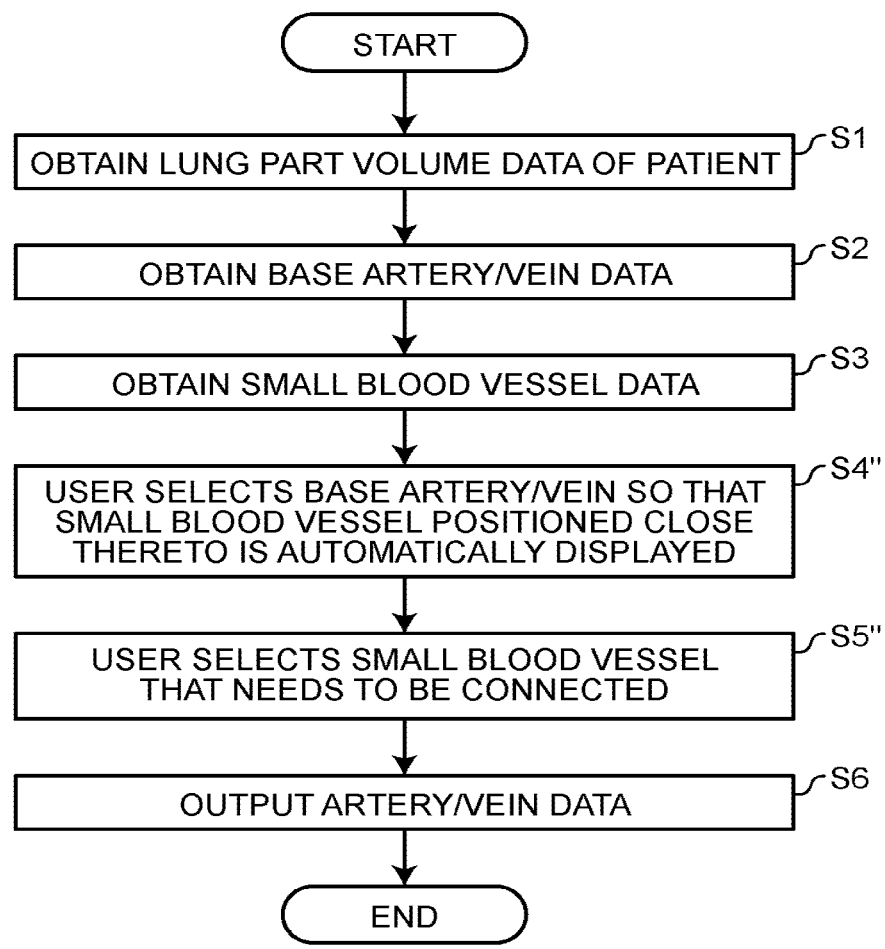

IMAGE PROCESSING APPARATUS, IMAGE PROCESSING METHOD, AND RECORDING MEDIUM

CROSS-REFERENCE TO RELATED APPLICATIONS

This application is based upon and claims the benefit of priority from Chinese Patent Application No. 202210037888.0, filed on Jan. 13, 2022; and Japanese Patent Application No. 2022-180755, filed on Nov. 11, 2022, the entire contents of all of which are incorporated herein by reference.

FIELD

Embodiments described herein relate generally to an image processing apparatus, an image processing method, and a recording medium.

BACKGROUND

In the field of medical image imaging, accurately segmenting and separating blood vessels is effective in diagnosing processes and treatment for diseases of the vascular system. For example, in surgical resection of a nodule between pulmonary segments using a three-dimensional (3D) guide, detecting a subsegment and a blood vessel positioned on the more distal side can assist the practitioner in determining a boundary for the segmentectomy more properly.

There are various types of blood vessel segmentation methods that are conventionally known.

Examples of the known blood vessel segmentation methods include: a method by which a blood vessel is segmented with a technique for detecting a tubular object by using a threshold value or a multiscale scheme; and a method by which a blood vessel is tracked along a centerline with a combination of various methods including a tracking method.

Further, some blood vessel segmentation methods use an algorithm based on deep learning. More specifically, with the algorithm, a centerline Dice (clDice) is introduced so as to improve detection contiguity. By using two networks for segmentation and for separation at the same time, it is possible to ensure contiguity in artery/vein separation by using a post-processing technique such as a graph-cut scheme, for example.

Further, examples of the known blood vessel segmentation methods include a method that uses a Convolutional Neural Network (CNN) and a tracking scheme. More specifically, according to a method, initial segmentation is performed via a CNN, and a blood vessel is subsequently tracked according to a centerline resulting from the initial segmentation and a hypothetical path direction, so as to detect a blood vessel on the distal side.

However, as for small blood vessels positioned on the distal side, according to the blood vessel segmentation method described above, the small blood vessels positioned on the distal side have low contrast, have minuscule structures, are distant from a root part of the blood vessel, and lack in information about the entire blood vessel. For this reason, it is difficult to realize artery/vein separation by accurately segmenting the small blood vessels positioned on the distal side.

More specifically, when multiscale blood vessel detection is carried out by using a conventional blood vessel segmentation method, it is difficult to eliminate interferences that are close to the grayscale of a blood vessel in a lesion site or the like. Further, because the shapes of blood vessels are complicated and easily change, and the grayscale levels change from the root to the periphery of the blood vessels, it is difficult to apply a conventional algorithm thereto.

Further, with the algorithm based on deep learning, an improvement can be made to a certain extent by maintaining contiguity of the blood vessels. However, for example, with a method using a network output probability map, it is not possible to effectively improve the problem where artery/vein separation is difficult because probabilities of small blood vessels positioned on the distal side are low. Further, it is also difficult to generate ground truth (GT) of complete blood vessels.

Further, the "CNN+tracking" method is suitable for situations where there are not many blood vessel branches, and the blood vessels are thick, while the blood vessels have clear contrast. On the contrary, for small blood vessels positioned on the distal side, it is not very easy to address the situations where there are many branches, and the directions of the blood vessel branches vary.

As explained above, the blood vessel segmentation methods that are conventionally known have the problems where the small blood vessel branches may be missing, blood vessels positioned on the distal side may be missing, artery/vein blood vessels positioned on the distal side may be misclassified or non-contiguous.

Further, segmenting other tubular objects such as the trachea has problems similar to the problems of the blood vessel segmentation described above.

BRIEF DESCRIPTION OF THE DRAWINGS

FIG. 3 is a table illustrating a relationship between points in shapes of structures in volume data and feature values in a Hessian matrix corresponding thereto;

FIG. 6 is a drawing illustrating an example in which artery data is generated by connecting a plurality of small blood vessels to the base artery data of the lung part illustrated in FIG. 2A;

FIG. 7 is a drawing illustrating an example in which vein data is generated by connecting a plurality of small blood vessels to the base vein data of the lung part illustrated in FIG. 2B;

FIG. 11 is a flowchart illustrating a procedure in a process (an image processing method) performed by an image processing apparatus according to a first modification example of the present embodiment; and FIG. 12 is a flowchart illustrating a procedure in a process (an image processing method) performed by an image processing apparatus according to a second modification example of the present embodiment.

DETAILED DESCRIPTION

An image processing apparatus according to an embodiment of the present disclosure includes processing circuitry. The processing circuitry is configured to obtain volume data of a subject. The processing circuitry is configured to obtain base tubular object data by segmenting the volume data. The processing circuitry is configured to obtain small tubular object data from the volume data. The processing circuitry is configured to generate updated base tubular object data, on the basis of the small tubular object data and the base tubular object data. The processing circuitry is configured to output the updated base tubular object data.

Exemplary embodiments of an image processing apparatus and an image processing method of the present disclosure will be explained below, with reference to the accompanying drawings.

The image processing apparatus according to the present embodiment includes a plurality of functional modules and may be installed, as software, in a device including a Central Processing Unit (CPU) and a memory such as an independent computer or may be installed in a plurality of devices in a distributed manner, so as to be realized as a result of a processor provided in one of the devices executing functional modules of the image processing apparatus stored in the memory. Alternatively, the image processing apparatus may be realized as hardware in the form of circuitry capable of implementing various functions thereof. The circuitry realizing the image processing apparatus is able to transmit and receive data and to acquire data, via a network such as the Internet.

Further, the image processing apparatus according to the present embodiment may be provided in an actual setting where medical images are acquired, so that a segmentation process is performed on the images in the actual setting. Further, the image processing apparatus may be directly installed in a medical image acquisition apparatus such as a Computed Tomography (CT) apparatus or a magnetic resonance imaging apparatus, as a part of the medical image acquisition apparatus.

In the following sections, a mode in which the image processing apparatus performs a segmentation process on a medical image will be explained, by using an example of the medical image taken of pulmonary blood vessels. However, the present embodiment is not limited to this example. It is also possible to apply the present embodiment to a segmentation process performed on other tubular objects such as the trachea rendered in a medical image.

Next, the present embodiment will be explained with reference to FIGS. 1 to 8.

Figure 1:
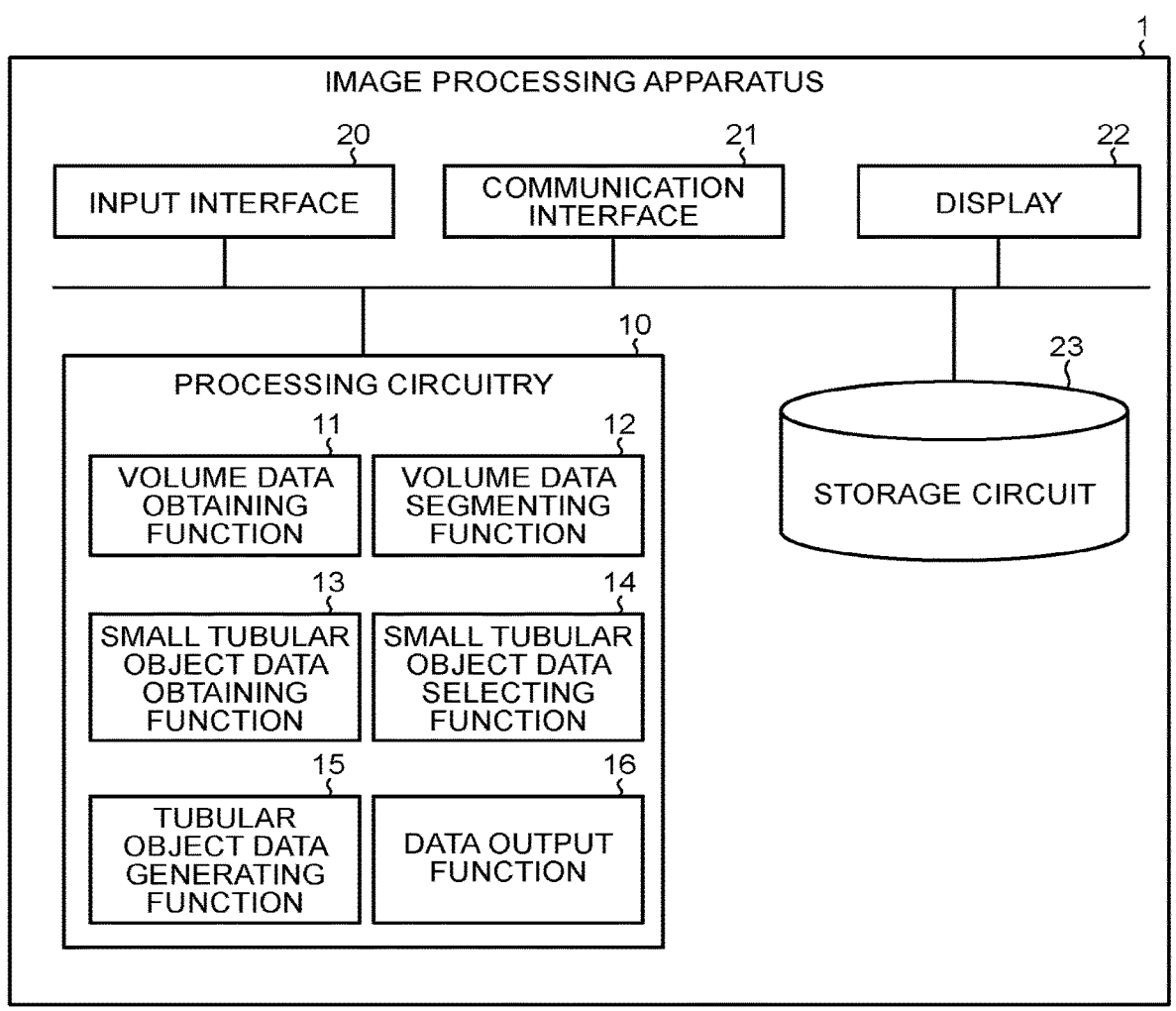
FIG. 1 is a block diagram illustrating an exemplary configuration of an image processing apparatus according to an embodiment of the present disclosure.

FIG. 1 is a block diagram illustrating an exemplary configuration of an image processing apparatus according to the present embodiment. For example, as illustrated in FIG. 1, an image processing apparatus 1 includes an input interface 20, a communication interface 21, a display 22, processing circuitry 10, and a storage circuit 23.

The input interface 20 is realized by using a trackball, a switch button, a mouse, a keyboard, a touchpad on which input operations can be performed by touching an operation surface thereof, a touch screen in which a display screen and a touchpad are integrally formed, a contactless input circuit using an optical sensor, an audio input circuit, and/or the like that are used for establishing various types of settings and the like. The input interface 20 is connected to the processing circuitry 10 and is configured to convert input operations received from an operator into electrical signals and to output the electrical signals to the processing circuitry 10. Further, although the input interface 20 is provided inside the image processing apparatus 1 in FIG. 1, the input interface 20 may be provided on the outside thereof.

The display 22 is connected to the processing circuitry 10 and is configured to display various types of information and various types of image data output from the processing circuitry 10. For example, the display 22 is realized by using a liquid crystal monitor, a Cathode Ray Tube (CRT) monitor, a touch panel, or the like. For example, the display 22 is configured to display a Graphical User Interface (GUI) for receiving instructions from the operator, as well as various types of display images and various types of processing results obtained by the processing circuitry 10. The display 22 is an example of a display unit. Further, although the display 22 is provided inside the image processing apparatus 1 in FIG. 1, the display 22 may be provided on the outside thereof.

The communication interface 21 may be a Network Interface Card (NIC) or the like and is configured to communicate with other devices and apparatuses. For example, the communication interface 21 is connected to the processing circuitry 10 and is configured to acquire image data from an ultrasound diagnosis apparatus realized with an ultrasound system or from other modalities besides the ultrasound system such as an X-ray Computed Tomography (CT) apparatus or a Magnetic Resonance Imaging (MRI) apparatus and configured to output the acquired image data to the processing circuitry 10.

The storage circuit 23 is connected to the processing circuitry 10 and is configured to store therein various types of data. For example, the storage circuit 23 is realized by using a semiconductor memory element such as a Random Access Memory (RAM) or a flash memory, or a hard disk, an optical disk, or the like. Further, the storage circuit 23 is configured to store therein programs corresponding to processing functions executed by the processing circuitry 10. Further, although the storage circuit 23 is provided inside the image processing apparatus 1 in FIG. 1, the storage circuit 23 may be provided on the outside thereof.

In response to the input operations received from the operator via the input interface 20, the processing circuitry 10 is configured to control various constituent elements included in the medical image processing apparatus 1.

For example, the processing circuitry 10 may be realized by using one or more processors. As illustrated in FIG. 1, the processing circuitry 10 includes a volume data obtaining function 11, a volume data segmenting function 12, a small tubular object data obtaining function 13, a small tubular object data selecting function 14, a tubular object data generating function 15, and a data output function 16. In this situation, the processing functions executed by the constituent elements of the processing circuitry 10 illustrated in FIG. 1, namely, the volume data obtaining function 11, the volume data segmenting function 12, the small tubular object data obtaining function 13, the small tubular object data selecting function 14, the tubular object data generating function 15, and the data output function 16 are recorded in the storage circuit 23 of the image processing apparatus 1 in the form of computer-executable programs, for example. The processing circuitry 10 is a processor configured to realize the processing functions corresponding to the programs by reading and executing the programs from the storage circuit 23. In other words, the processing circuitry 10 that has read the programs has the functions illustrated within the processing circuitry 10 in FIG. 1.

The term "processor" used in the above explanations denotes, for example, a Central Processing Unit (CPU), a Graphics Processing Unit (GPU), or a circuit such as an Application Specific Integrated Circuit (ASIC) or a programmable logic device (e.g., a Simple Programmable Logic Device (SPLD), a Complex Programmable Logic Device (CPLD), or a Field Programmable Gate Array (FPGA)). When the processor is a CPU, for example, the processor is configured to realize the functions by reading and executing the programs saved in the storage circuit 23. In contrast, when the processor is an ASIC, for example, instead of having the programs saved in the storage circuit 23, the programs are directly incorporated in the circuitry of the processor. Further, the processors in the present embodiments do not each necessarily have to be structured as a single circuit. It is also acceptable to structure one processor by combining together a plurality of independent circuits so as to realize the functions thereof. Furthermore, two or more of the constituent elements illustrated in FIG. 1 may be integrated into one processor, so as to realize the functions thereof.

Next, details of processes of the volume data obtaining function 11, the volume data segmenting function 12, the small tubular object data obtaining function 13, the small tubular object data selecting function 14, the tubular object data generating function 15, and the data output function 16 executed by the processing circuitry 10 will be explained.

To begin with, processes performed by the volume data obtaining function 11 will be explained.

The volume data obtaining function 11 is configured to obtain volume data of an examined site of a subject (hereinafter, "patient"). In this situation, the volume data obtaining function 11 is an example of a "volume data obtaining unit".

Before the patient is examined or treated, it is necessary, generally speaking, to obtain clear volume data having an excellent anatomical environment for the examined site, by performing a three-dimensional (3D) scan on the examined site, in order to learn an overall situation of the examined site. The volume data may be arbitrary volume data such as volume data obtained by performing a CT scan on the examined site of the patient or volume data obtained by performing an MR scan on the examined site.

The examined site may be a single organ such as a lung part, the heart, or the liver or may be one body part such as a chest part including the lungs.

In the present embodiment, a lung part will be explained as an example.

Next, processes performed by the volume data segmenting function 12 will be explained.

The volume data segmenting function 12 is configured to obtain base tubular object data related to tubular object data of the examined site, by segmenting the volume data obtained by the volume data obtaining function 11. In this situation, the volume data segmenting function 12 is an example of a "volume data segmenting unit".

Figure 2A:
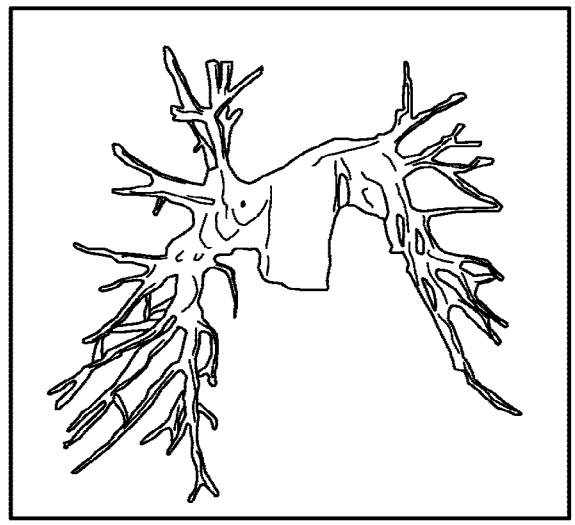
FIG. 2A is a drawing illustrating base artery data obtained by segmenting volume data of a lung part.
Figure 2B:
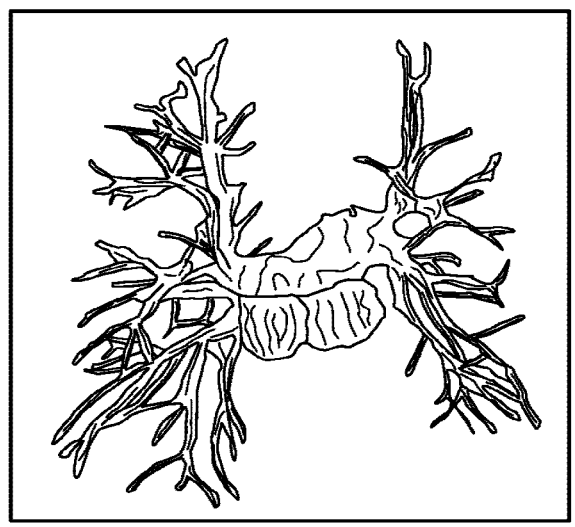
FIG. 2B is a drawing illustrating base vein data obtained by segmenting the volume data of the lung part.

In the present embodiment, tubular objects will be explained, while artery blood vessels and vein blood vessels are used as examples. As illustrated in FIGS. 2A and 2B, the volume data segmenting function 12 is configured to obtain base artery data (see FIG. 2A) and base vein data (see FIG. 2B), by performing initial segmentation on the volume data related to the lung part.

The base artery data illustrated in FIG. 2A is data related to thick artery blood vessels in the lung part and lacks in small artery blood vessel data. Similarly, the base vein data illustrated in FIG. 2B is data related to thick vein blood vessels in the lung part and lacks in small vein blood vessel data.

The method for performing the initial segmentation may be an arbitrary method and may be an initial segmentation net method based on deep learning or a conventional segmentation method such as a segmentation method based on a threshold value. Any segmentation method is acceptable, as long as it is possible to obtain the base artery data and the base vein data of the lung part.

Next, processes performed by the small tubular object data obtaining function 13 will be explained.

The small tubular object data obtaining function 13 is configured to obtain small tubular object data related to the tubular object data of the examined site, from the volume data obtained by the volume data obtaining function 11. In this situation, the small tubular object data obtaining function 13 is an example of a "small tubular object data obtaining unit".

In the present embodiment, the small tubular object data obtaining function 13 is configured to obtain small blood vessel data of the lung part and blood vessel data positioned on the distal site, from the volume data of the lung part. In this situation, the "distal side" denotes being positioned in an end part that is more distant than a thick blood vessel regarded as a trunk is and may be referred to as being at a "peripheral end". Generally speaking, blood vessels positioned on the distal side are also extremely small blood vessels.

In the present embodiment, the small tubular object data obtaining function 13 is configured to detect and obtain the small blood vessel data from the volume data of the lung part, by using a detection operator for small-sized tubular objects, on the basis of configurations of small blood vessels and a grayscale feature.

More specifically, the small tubular object data obtaining function 13 is configured to calculate an enhanced feature value in a Hessian matrix of small-sized tubular objects in an intrapulmonary region, as the detection operator for the small-sized tubular objects. A specific method for detecting the small blood vessel data implemented by the small tubular object data obtaining function 13 will be explained below.

The Hessian matrix is a matrix of a partial derivative of second order being a multivariable mathematical function. The small tubular object data obtaining function 13 is able to detect the configurations of the blood vessels on the basis of attributes of feature values.

FIG. 3 is a table illustrating a relationship between points in shapes of structures in the volume data and the feature values in a Hessian matrix corresponding thereto.

In the present example, for instance, let us discuss a situation in which the bronchi are extracted as a tubular structure. In this situation, a branch part of the bronchi is closer to a spherical structure than to a tubular structure. For this reason, when only tubular structures are extracted as feature values, there is a possibility that the branch part may be missing. Further, in a structure where a nodule wraps around the bronchi, there is a possibility that the nodule part may be missing. For these reasons, in the example in FIG. 3, spherical structures are also added to the feature values in the Hessian matrix, while taking spherical approximations of a branch positions and a nodule position into consideration.

Each of the points in the volume data of the lung part has three feature values $\lambda_1$, $\lambda_2$, and $\lambda_3$ as illustrated in FIG. 3. The example in FIG. 3 indicates a result of judging the feature values $\lambda_1$, $\lambda_2$, and $\lambda_3$ with a threshold value. For example, when a feature value is smaller than a first threshold value, a judgment result is expressed as "L". When a feature value is equal to or larger than the first threshold value, a judgment result is expressed as "H−". When a feature value is equal to or larger than a second threshold value larger than the first threshold value, a judgment result is expressed as "H+". For example, FIG. 3 indicates that, when the judgment results of the feature values $\lambda_1$, $\lambda_2$, and $\lambda_3$ are "L", "H−", and "H+", respectively, the shape of the structure in the volume data represents a small blood vessel. As another example, when the judgment results of the feature values $\lambda_1$, $\lambda_2$, and $\lambda_3$ are "H−", "H−", and "H−", respectively, the shape of the structure in the volume data represents a branch part.

The small tubular object data obtaining function 13 is configured to calculate, with respect to each of the points, an enhanced feature value of tubular objects on the basis of the three feature values $\lambda_1$, $\lambda_2$, and $\lambda_3$.

As a method for calculating the enhanced feature value of the tubular objects, the small tubular object data obtaining function 13 is configured to use a known Frangi filter algorithm presented in the expressions below, for example.

$$v_F = \left(1 - \exp\left(-\frac{R_A^2}{2a^2}\right)\right)\left(1 - \exp\left(-\frac{S^2}{2k^2}\right)\right) \quad (1)$$

$$S = \sqrt{\lambda_1^2 + \lambda_2^2 + \lambda_3^2} \quad (2)$$

$$R_A = \lambda_2/\lambda_3 \quad (3)$$

In the above expression, VF denotes the enhanced feature value of tubular objects, whereas a and k are each a hyper parameter of which the value can be changed.

The small tubular object data obtaining function 13 is able to calculate the enhanced feature value of the small tubular objects, by setting the hyper parameters a and k to appropriate values in the calculations of the above expressions.

In the present embodiment, by calculating an enhanced feature value at each of the points in the small blood vessel structures in the volume data of the lung part, i.e., in the intrapulmonary region, according to the above expressions, the small tubular object data obtaining function 13 is able to obtain an enhancement image of the small blood vessels in which the structures of the small blood vessels are displayed in an enhanced manner, while the structures in the other parts are suppressed.

After that, with respect to the base artery data and the base vein data obtained by the volume data segmenting function 12, the small tubular object data obtaining function 13 is configured to statistically calculate grayscale distribution ranges ($I_{lower}$ and $I_{higher}$) of the image and to further set a reference threshold value for the small blood vessels positioned on the distal side. (For example, the reference threshold value may be set as "$I_{lower}+\sigma$", where is a constant value that is either a positive value or a negative value.)

The small tubular object data obtaining function 13 is able to obtain a blood vessel probability map for the small blood vessels in the intrapulmonary region, by keeping small blood vessel structures of which the enhanced feature value is larger than the reference threshold value and eliminating small blood vessel structures of which the enhanced feature value is smaller than the reference threshold value, with respect to the points in the blood vessel structures in the intrapulmonary region. In other words, the small tubular object data obtaining function 13 is able to obtain the blood vessel probability map of the small blood vessels, on the basis of the enhanced feature values of the small blood vessel structures and the grayscale distribution ranges of the base artery data and the base vein data.

As described above, one of the methods for filtering the small blood vessel structures was explained by which the reference threshold value is set for the small blood vessels on the basis of the grayscale distribution ranges of the base artery data and the base vein data. However, it is possible to use various other methods as a method for setting the reference threshold value and a method for filtering the small blood vessel structures. Thus, possible embodiments are not limited to the methods described above.

Subsequently, the small tubular object data obtaining function 13 is configured to obtain small blood vessel region within the volume data of the lung part, i.e., the intrapulmonary region, by performing segmentation that uses an adaptive threshold value on the blood vessel probability map.

More specifically, the small tubular object data obtaining function 13 is able to obtain the small blood vessel regions within the intrapulmonary region, by calculating a grayscale histogram of the blood vessel probability map, for example, and further performing segmentation that uses a threshold value on the blood vessel probability map according to Otsu's method.

The method for performing the segmentation that uses the adaptive threshold value on the blood vessel probability map has thus been explained as an example. However, it is also acceptable to adopt other methods for performing segmentation that uses an adaptive threshold value on the blood vessel probability map.

Next, processes performed by the small tubular object data selecting function 14 will be explained.

The small tubular object data selecting function 14 is configured to obtain selected small tubular object data, by eliminating certain parts that are shared in common with the base tubular object data and further eliminating certain tubular object data outside of a threshold value range, from the small tubular object data obtained by the small tubular object data obtaining function 13. In this situation, the small tubular object data selecting function 14 is an example of a "small tubular object data selecting unit".

Figure 4A:
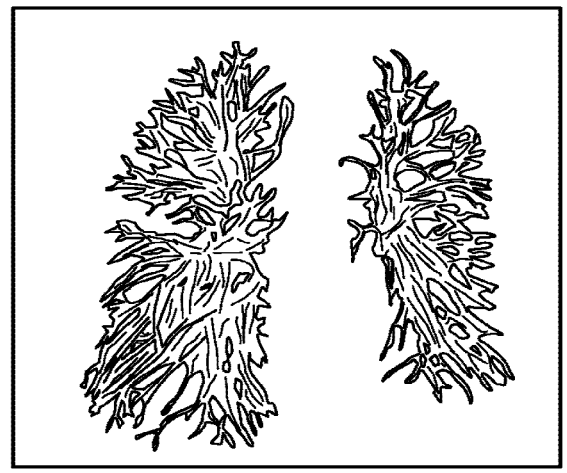
FIG. 4A is a drawing illustrating small blood vessel data obtained from the volume data of the lung part.
Figure 4B:
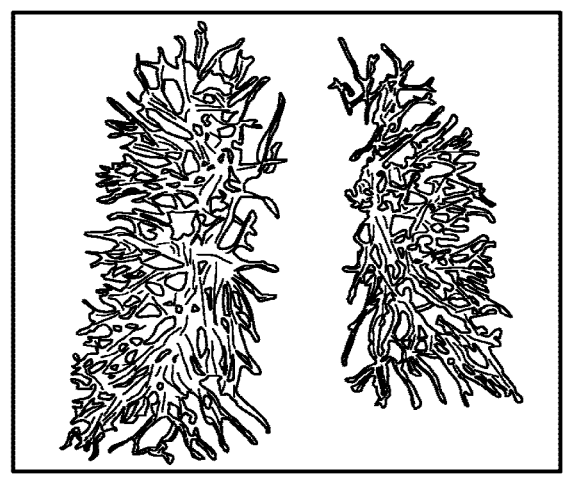
FIG. 4B is a drawing illustrating small blood vessel data obtained by eliminating a part shared in common with base artery/vein data from the small blood vessel data in FIG. 4A.

FIG. 4A illustrates the small blood vessel data obtained from the volume data of the lung part by the small tubular object data obtaining function 13. To begin with, as a first selecting process, the small tubular object data selecting function 14 is configured to eliminate parts (crossover parts) that are shared in common with the base artery data and the base vein data from the small blood vessel data, so as to obtain, from the small blood vessel data, a small blood vessel contiguous region other than the base artery data and the base vein data (see FIG. 4B).

The elimination method used in the first selecting process may be a method by which, for example, the small blood vessel data obtained by the small tubular object data obtaining function 13 is superimposed over the base artery data and the base vein data obtained by the volume data segmenting function, so as to eliminate the parts (the crossover parts) that are shared in common with the two pieces of data, from the small blood vessel data.

After that, as a second selecting process, the small tubular object data selecting function 14 is configured to calculate the size of a contiguous region of each of the blood vessels, with respect to the small blood vessel data from which the shared parts have been eliminated and to further eliminate, from the small blood vessel data, certain blood vessel data of which the size of the contiguous region of the blood vessel is outside a threshold value range that is set in advance. In other words, the small tubular object data selecting function 14 is configured to eliminate too large and too small blood vessel data from the small blood vessel data.

In another example, as a selecting process performed on the small blood vessel data, the small tubular object data selecting function 14 may be configured to calculate a shape feature of each of the vessels and to eliminate non-tubular object data from the small blood vessel data. The reason is that there is a possibility that various types of processes performed on the small blood vessel data may have changed some of the small blood vessel data into non-tubular object data, and there is also a possibility that the initially-acquired small blood vessel data may include non-blood vessel shapes.

As a result of the first selecting process and the second selecting process described above, the small tubular object data selecting function 14 is configured to obtain, as selected small blood vessel data, the small blood vessel data obtained by eliminating the parts that are shared in common with the base artery data and the base vein data, and further eliminating the certain blood vessel data outside the threshold value range, from the small blood vessel data obtained by the small tubular object data obtaining function 13.

In this situation, the small tubular object data selecting function 14 may perform one of the first and the second selecting processes. In that situation, as the first selecting process, the small tubular object data selecting function 14 may be configured to obtain, as the selected small blood vessel data, the small blood vessel data obtained by eliminating the parts that are shared in common with the base artery data and the base vein data, from the small blood vessel data obtained by the small tubular object data obtaining function 13. Alternatively, as the second selecting process, the small tubular object data selecting function 14 may be configured to obtain, as the selected small blood vessel data, the small blood vessel data obtained by eliminating the blood vessel data outside the threshold value range, from the small blood vessel data obtained by the small tubular object data obtaining function 13.

Next, processes performed by the tubular object data generating function 15 will be explained.

The tubular object data generating function 15 is configured to generate updated base tubular object data, on the basis of the selected small tubular object data obtained by the small tubular object data selecting function 14 and the base tubular object data obtained by the volume data segmenting function 12. In this situation, the tubular object data generating function 15 is an example of a "tubular object data generating unit".

For example, the tubular object data generating function 15 is configured to generate the updated base tubular object data, by performing a contiguity analysis on the selected small tubular object data and the base tubular object data and further connecting a certain part of the selected small tubular object data satisfying a contiguity condition, to the base tubular object data.

More specifically, to begin with, as a first generating process, the tubular object data generating function 15 is configured to perform a contiguity analysis on the selected small tubular object data and the base tubular object data. After that, the tubular object data generating function 15 is configured to generate updated base tubular object data, by obtaining, from the selected small tubular object data, first partial small tubular object data satisfying the contiguity condition and subsequently connecting the obtained first partial small tubular object data to the base tubular object data.

Further, as a second generating process following the first generating process, the tubular object data generating function 15 is configured to perform a contiguity analysis on remaining selected small tubular object data that remains after eliminating the first partial small tubular object data from the selected small tubular object data and on the updated base tubular object data. After that, the tubular object data generating function 15 is configured to generate updated base tubular object data, by obtaining, from the remaining selected small tubular object data, second partial small tubular object data satisfying the contiguity condition and subsequently connecting the obtained second partial small tubular object data to the updated base tubular object data.

In this situation, the tubular object data generating function 15 is configured to generate tubular object data, by repeatedly performing the abovementioned generating processes, namely the first generating process and the second generating process following the first generating process, until there is no longer small tubular object data to be connected to the updated base tubular object data. In other words, the tubular object data generating function 15 is able to obtain final tubular object data, by repeatedly performing the process of generating the updated base tubular object data, until there is no longer selected small tubular object data to be connected to the updated base tubular object data.

Figure 5:
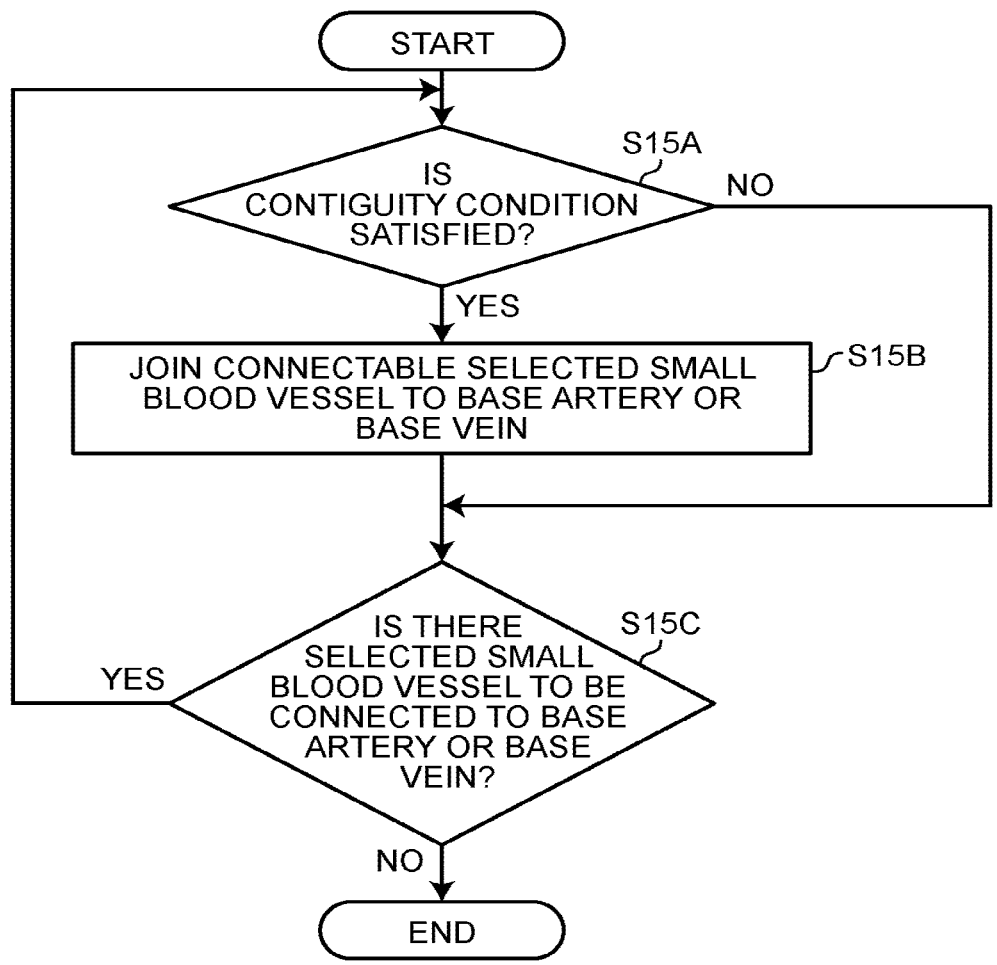
FIG. 5 is a chart illustrating a process of connecting the small blood vessel data to the base artery/vein data.

Next, a processing procedure performed by the tubular object data generating function 15 will be explained with reference to FIG. 5. In FIG. 5, steps S15A, S15B, and S15C are steps executed as a result of the processing circuitry 10 invoking a program corresponding to the tubular object data generating function 15 from the storage circuit 23. In FIG. 5, steps S15A and S15B correspond to the generating processes described above.

At first, at step S15A in FIG. 5, the tubular object data generating function 15 performs the contiguity analysis on the selected small blood vessel data obtained by the small tubular object data selecting function 14 and the base artery data and the base vein data obtained by the volume data segmenting function 12. More specifically, at step S15A, the tubular object data generating function 15 judges whether or not the selected small blood vessel data is connectable to the base artery data or the base vein data (whether the contiguity condition is satisfied). For example, the tubular object data generating function 15 selects one of a plurality of pieces of selected small blood vessel data and judges whether or not the piece of selected small blood vessel data satisfies the contiguity condition. In the following sections, the process at step S15A will be explained in detail.

In the description of FIG. 5, the selected small blood vessel data will be referred to as the "selected small blood vessel", whereas the base artery data and the base vein data will be referred to as the "base artery" and the "base vein", respectively. Further, in the description of FIG. 5, the base artery data and the base vein data will collectively be referred to as the "base artery/vein".

At step S15A, with regard to the contiguity analysis, the tubular object data generating function 15 judges whether or not one or more of a first condition, a second condition, and a third condition are satisfied, as explained below, for example.

To begin with, the first condition will be explained. The tubular object data generating function 15 sets a connection position between the selected small blood vessel and the base artery/vein. Examples of the connection position include: the periphery of the base artery/vein, a trunk position of the base artery/vein, and a blood vessel intermediate position of the base artery/vein. As the first condition, the tubular object data generating function 15 judges whether or not the selected small blood vessel is contiguous with the base artery or the base vein. For example, when the peripheral end position of the base artery/vein and the trunk position of the selected small blood vessel are within a predetermined distance range, the tubular object data generating function 15 determines that the first condition is satisfied and that the selected small blood vessel is contiguous with the base artery or the base vein.

Next, the second condition will be explained. As the second condition, the tubular object data generating function 15 judges whether or not the angles of the extending directions of the selected small blood vessel and the base artery/vein are substantially equal to each other. For example, when the extending direction of the selected small blood vessel and the extending direction of the base artery are each downward, the tubular object data generating function 15 determines that the angles of the extending directions of the selected small blood vessel and the base artery are the same as each other and determines, as a result, that the selected small blood vessel is contiguous with the base artery. When the extending direction of the selected small blood vessel is downward, while the extending direction of the base artery is toward the left, the tubular object data generating function 15 determines that the angles of the extending directions of the selected small blood vessel and the base artery are different from each other and determines, as a result, that the selected small blood vessel is not contiguous with the base artery.

Next, the third condition will be explained. As the third condition, the tubular object data generating function 15 judges whether or not the vessel diameter ratio between the selected small blood vessel and the base artery/base vein exceeds a predetermined threshold value. For example, the tubular object data generating function 15 calculates the vessel diameters of both the selected small blood vessel and the base artery, at a location where the selected small blood vessel is connected to the base artery and further calculates the vessel diameter ratio between the two, so as to compare the calculated ratio with a threshold value set in advance. In this situation, when the calculated ratio is larger than the threshold value, i.e., when the difference in vessel diameter between the selected small blood vessel and the base artery is too large, the tubular object data generating function 15 determines that the selected small blood vessel is not contiguous with the base artery. On the contrary, when the calculated ratio is equal to or smaller than the threshold value, the tubular object data generating function 15 determines that the selected small blood vessel is contiguous with the base artery.

In an example, the tubular object data generating function 15 may comprehensively take into account the connection position, the angles of the extending directions, and the magnitude of the vessel diameter ratio of the blood vessels. For example, the tubular object data generating function 15 may judge whether the three conditions (the first condition, the second condition, and the third condition) are satisfied, so as to determine that the selected small blood vessel is contiguous with the base artery or the base vein if the three conditions are each satisfied. By using method, the tubular object data generating function 15 is able to effectively eliminate certain selected small blood vessels having a low possibility of being contiguous.

Further, the tubular object data generating function 15 may be configured to judge contiguity on the basis of the angle of the extending direction of the selected small blood vessel and the angle of the extending direction of the base artery/vein. For example, when the angle of the extending direction of the selected small blood vessel is close to the angle of the extending direction of the base vein than to the angle of the extending direction of the base artery, the tubular object data generating function 15 may determine that the selected small blood vessel is contiguous with the base vein.

A number of conditions that can be used for the judgment in the contiguity analysis of the blood vessels have thus been explained. When judging the contiguity of the blood vessels, the tubular object data generating function 15 may use one of the conditions for making the judgment in the contiguity analysis of the blood vessels or may use two or more of the conditions in combination for making the judgment in the contiguity analysis of the blood vessels. Further, possible embodiments are not limited to the abovementioned conditions for the contiguity analysis of the blood vessels. It is also acceptable to make judgment in the contiguity analysis of the blood vessels, by using other conditions.

Subsequently, as a result of the judgement at step S15A as to whether or not the selected small blood vessel is connectable to the base artery or the base vein (whether the contiguity condition is satisfied), upon determining that the contiguity condition is not satisfied (step S15A: No), the tubular object data generating function 15 performs the process at step S15C explained below. On the contrary, upon determining that the contiguity condition is satisfied (step S15A: Yes), the tubular object data generating function 15 performs the process at step S15B in FIG. 5. More specifically, the tubular object data generating function 15 forms an updated base artery or base vein, by joining the selected small blood vessel to the base artery or the base vein, i.e., by connecting the selected small blood vessel to the base artery or the base vein. In this situation, the tubular object data generating function 15 is configured to update a set made up of selected small blood vessels by eliminating the joined selected small blood vessel from the set made up of selected small blood vessels.

Subsequently, at step S15C in FIG. 5, the tubular object data generating function 15 judges whether or not there is a selected small blood vessel to be connected to the updated base artery or base vein. More specifically, the tubular object data generating function 15 judges whether or not there is a selected small blood vessel that has not been judged as to whether the contiguity condition is satisfied thereby.

For example, upon determining that there is a selected small blood vessel to be connected to the updated base artery or base vein (step S15C: Yes), the tubular object data generating function 15 performs the processes at steps S15A and S15B again. More specifically, when there is at least one selected small blood vessel that has not been judged as to whether the contiguity condition is satisfied thereby, the tubular object data generating function 15 performs the processes at steps S15A and S15B again.

More specifically, at step S15A, the tubular object data generating function 15 performs the contiguity analysis on the remaining selected small blood vessel data that remains after eliminating the small blood vessel data connected to the base artery or the base vein from the selected small blood vessel data and on the updated base artery/vein. After that, upon determining that the selected small blood vessel is connectable to the updated base artery or base vein (the contiguity condition is satisfied) at step S15B, the tubular object data generating function 15 performs the following processes: To begin with, the tubular object data generating function 15 forms an updated base artery or base vein by connecting the selected small blood vessel to the updated base artery or base vein. In this situation, the tubular object data generating function 15 updates the set made up of selected small blood vessels, by eliminating the connected selected small blood vessel from the set made up of selected small blood vessels.

In this manner, the tubular object data generating function 15 repeatedly performs the processes of updating the set made of up selected small blood vessel data and updating the base artery/vein data, until there is no longer selected small blood vessel data satisfying the contiguity condition, by performing the processes described above. In other words, the tubular object data generating function 15 performs the processes at steps S15A and S15B, until there is no longer a small blood vessel to be connected to the updated base artery or base vein.

For example, upon determining that there is no longer a selected small blood vessel to be connected to the updated base artery or base vein (step S15C: No), the tubular object data generating function 15 ends the process. In that situation, the tubular object data generating function 15 is able to obtain the final tubular object data.

As explained above, by repeatedly performing the processes (the processes at steps S15A and S15B) of generating the updated base tubular object data, until there is no longer small tubular object data to be connected to the updated base tubular object data, the tubular object data generating function 15 is able to obtain the final tubular object data. For example, as illustrated in FIG. 6, the tubular object data generating function 15 generates artery data obtained by connecting a plurality of small blood vessels to the base artery data illustrated in FIG. 2A. Further, as illustrated in FIG. 7, the tubular object data generating function 15 generate vein data by connecting a plurality of small blood vessels to the base vein data illustrated in FIG. 2B.

In the embodiment described above, the example was explained in which the tubular object data generating function 15 is configured to perform the contiguity analysis on the selected small blood vessel data obtained by the small tubular object data selecting function 14 and on the base artery data and the base vein data; however, possible embodiments are not limited to this example. For instance, the tubular object data generating function 15 may be configured to perform a contiguity analysis on the small blood vessel data obtained by the small tubular object data obtaining function 13 and on the base artery data and the base vein data.

Next, processes performed by the data output function 16 will be explained.

The data output function 16 is configured to output the tubular object data generated by the tubular object data generating function 15. In this situation, the data output function 16 is an example of a "data output unit".

For example, in the present embodiment, the data output function 16 is configured to output the artery data and the vein data generated by the tubular object data generating function 15. For example, the data output function 16 is configured to cause the display 22 to display the artery data and the vein data.

In the present example, the data output function 16 is configured to output the tubular object data generated by the tubular object data generating function 15 as the final tubular object data; however, possible embodiments are not limited to this example. For instance, the data output function 16 may be configured, every time the tubular object data generating function 15 updates the base tubular object data, to output the updated base tubular object data, as interim tubular object data.

Next, a process (an image processing method) performed by the image processing apparatus 1 according to the present embodiment will be explained, with reference to FIG. 8. In the image processing method, an example of forming artery/vein data of the lung part will be explained.

Figure 8:
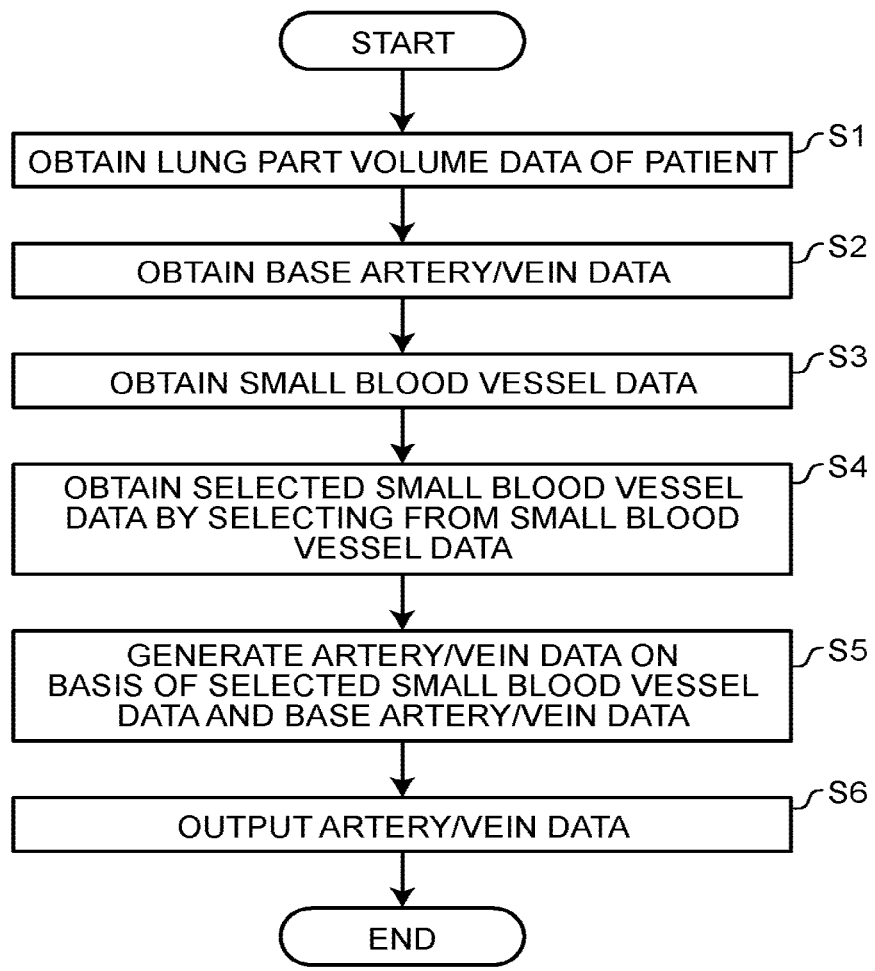
FIG. 8 is a flowchart illustrating a procedure in a process (an image processing method) performed by the image processing apparatus according to the present embodiment.

In FIG. 8, step S1 is a step executed as a result of the processing circuitry 10 invoking a program corresponding to the volume data obtaining function 11 from the storage circuit 23. At step S1, the volume data obtaining function 11 obtains the volume data relevant to the lung part of the patient. The volume data is arbitrary volume data, such as volume data obtained by performing a CT scan on the lung part serving as an examined site of the patient or volume data obtained by performing an MR scan on the lung part. In other words, the volume data obtaining function 11 obtains lung part volume data of the patient.

In FIG. 8, step S2 is a step executed as a result of the processing circuitry 10 invoking a program corresponding to the volume data segmenting function 12 from the storage circuit 23. At step S2, by implementing an arbitrary volume data segmentation method, the volume data segmenting function 12 obtains the base artery data and the base vein data by segmenting the lung part volume data obtained at step S1.

In FIG. 8, step S3 is a step executed as a result of the processing circuitry 10 invoking a program corresponding to the small tubular object data obtaining function 13 from the storage circuit 23. At step S3, the small tubular object data obtaining function 13 obtains the small blood vessel data from the lung part volume data obtained at step S1, by using the detection operator for small-sized tubular objects, on the basis of the configurations of the small blood vessels and the grayscale feature.

In FIG. 8, step S4 is a step executed as a result of the processing circuitry 10 invoking a program corresponding to the small tubular object data selecting function 14 from the storage circuit 23. At step S4, the small tubular object data selecting function 14 obtains the selected small blood vessel data by eliminating the parts that are shared in common with the base artery/vein data from the small blood vessel data obtained at step S3 and eliminating non-blood vessel data and certain blood vessel data outside the threshold value range for being too large or too small.

In FIG. 8, step S5 is a step executed as a result of the processing circuitry 10 invoking a program corresponding to the tubular object data generating function 15 from the storage circuit 23. At step S5, the tubular object data generating function 15 generate the artery/vein data on the basis of the selected small blood vessel data obtained at step S4 and the base artery/vein data obtained at step S2. More specifically, the tubular object data generating function 15 generates the artery/vein data, by analyzing whether or not the selected small blood vessel data is connectable to the base artery/vein and further connecting each of the connectable selected small blood vessel data, one by one, to either the base artery data or the base vein data.

In FIG. 8, step S6 is a step executed as a result of the processing circuitry 10 invoking a program corresponding to the data output function 16 from the storage circuit 23. At step S6, the data output function 16 outputs the artery data and the vein data generated at step S5.

Further, although certain small blood vessel data was selected at step S4 in the above example, this step may be omitted. It is acceptable to use other methods, as long as it is possible to generate artery data and vein data on the basis of the base artery data and the base vein data obtained at step S2 and the small blood vessel data obtained at step S3.

In the present embodiment, when the blood vessel (tubular object) segmentation is performed on the volume data, it is possible to accurately detect the small tubular objects of the patient, e.g., small blood vessel branches in the lung part. It is also possible to determine, without fail, the contiguity between the small blood vessel branches and the base artery/vein. Consequently, it is possible to detect the small blood vessels that may have been missing from the initial blood vessel segmentation and to also avoid misclassifying arteries/veins at the blood vessel peripheral ends.

First Modification Example

Figure 9:
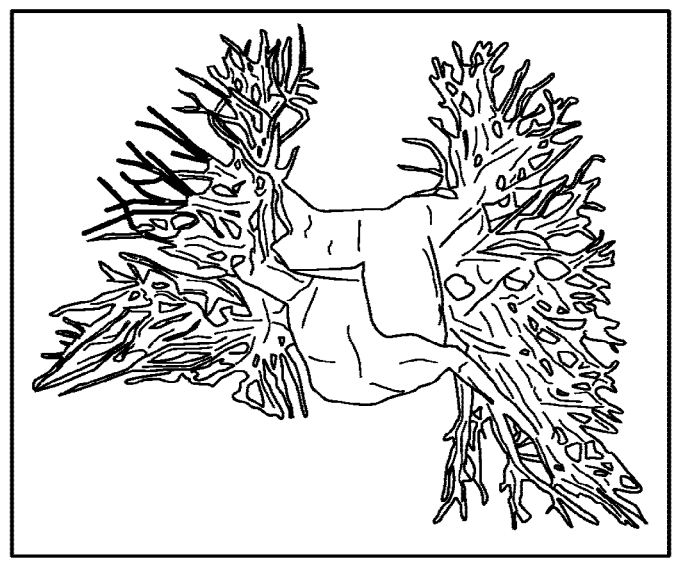
FIG. 9 is a drawing illustrating a result of combining the base artery data with the base vein data.
Figure 10:
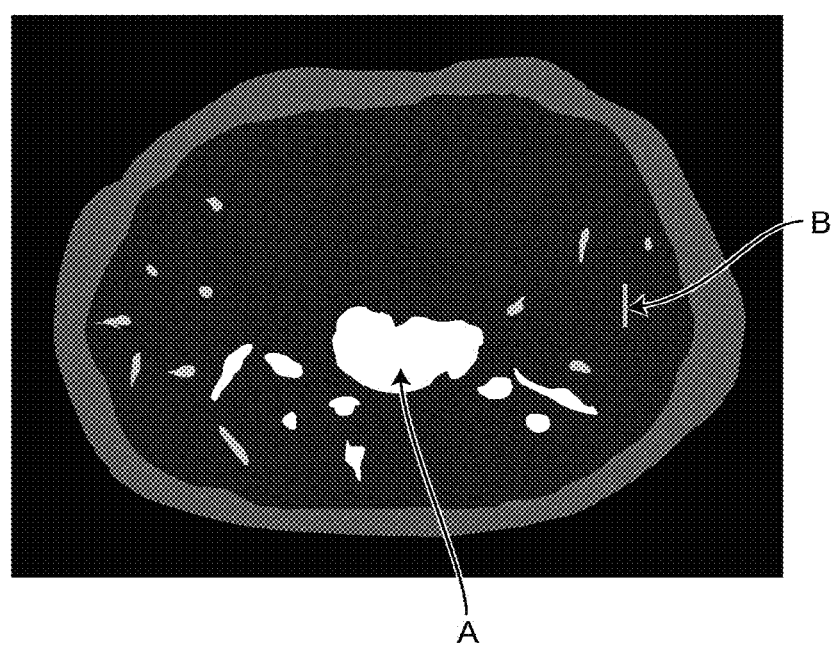
FIG. 10 is a drawing schematically illustrating a foreground probability map of the artery/vein data.

Next, a first modification example of the present embodiment will be explained, with reference to FIGS. 9 to 11.

For example, when the user wishes to classify an object to be segmented and the others, the object to be segmented is determined as a foreground, whereas the others are determined as a background, so that a learning process is performed while focusing on the foreground. Accordingly, in the first modification example, both base tubular object data and small tubular object data are obtained through the learning process.

The volume data segmenting function 12 is configured to obtain the base tubular object data, by segmenting the volume data obtained by the volume data obtaining function 11 while using deep learning (e.g., an initial segmentation net method based on deep learning). The volume data segmenting function 12 is configured to generate a foreground probability map and a background probability map with respect to the tubular object data, by further using the initial segmentation net method based on deep learning. In other words, the volume data segmenting function 12 is configured to generate the probability maps with respect to the object to be segmented.

For example, as for the base tubular object data, as a result of the deep learning judging whether each of the pixels belongs to the foreground or the background, on the basis of a relationship of magnitudes between the foreground probability and the background probability, the volume data segmenting function 12 is able to obtain the base tubular object data.

In contrast, as for the small tubular object data, the small tubular object data obtaining function 13 is able to obtain the small tubular object data, by filtering the foreground probability map with a threshold value. This is because in a region of small tubular objects such as slender blood vessels like peripheral blood vessels, there is a possibility that the deep learning may determine the background probability to be higher than the foreground probability. Thus, by filtering the foreground probability map with the use of the threshold value, the small tubular object data obtaining function 13 is able to obtain a region having a relatively higher foreground probability than that of the surrounding tissue within the foreground probability map, as the small tubular object data. In this manner, the small tubular object data obtaining function 13 is configured to process the foreground probability map with the threshold value and to thus obtain the region falling in a predetermined threshold value range within the foreground probability map, as the small tubular object data.

Processes performed by the volume data segmenting function 12 and small tubular object data obtaining function 13 in the first modification example will specifically be explained, by using an example of forming artery/vein data of the lung part.

The volume data segmenting function 12 is configured to obtain the base artery data (see FIG. 2A) and the base vein data (see FIG. 2B) by segmenting the lung volume data while using the initial segmentation net method based on deep learning. By further using the initial segmentation net method based on deep learning, the volume data segmenting function 12 is configured to generate a foreground probability map for the artery data and a foreground probability map for the vein data and to further obtain a foreground probability map for artery/vein data, by joining together the two foreground probability maps.

In this situation, the base artery data (FIG. 2A) and the base vein data (FIG. 2B) obtained by the volume data segmenting function 12 is data representing values each being 0 or 1. For example when the base artery data and the base vein data are combined together, data such as that illustrated in FIG. 9 is obtained.

Further, the foreground probability map obtained by the volume data segmenting function 12 is data representing probability values for extracting small blood vessels through a threshold value process. For example, when the foreground probability map of the artery/vein data is schematically expressed, a map illustrated in FIG. 10 is obtained. Although FIG. 10 schematically illustrates only an axial cross-section image of the foreground probability map, the foreground probability map further includes a sagittal cross-section image and a coronal cross-section image. In this situation, the small tubular object data obtaining function 13 is configured to process the foreground probability map illustrated in FIG. 10 by using threshold values. For example, the threshold value for the region indicated with the letter "A" is determined to be 1, whereas the threshold value for the region indicated with the letter "B" is determined to be 0.6. After that, from the foreground probability map illustrated in FIG. 10, the small tubular object data obtaining function 13 is configured to obtain foreground objects (a region) that fall in the threshold value range of 0.6 to 1, as the small blood vessel data.

Next, a process (an image processing method) performed by the image processing apparatus 1 according to the first modification example will be explained, with reference to FIG. 11.

In the image processing method according to the first modification example, only steps S2' and S3' are different from the image processing method in the embodiment described above, while the other steps are the same. Thus, only steps S2' and S3' will be explained below.

In FIG. 11, step S2' is a step executed as a result of the processing circuitry 10 invoking a program corresponding to the volume data segmenting function 12 from the storage circuit 23. At step S2', the volume data segmenting function 12 obtains the base artery/vein data by using the initial segmentation net method based on deep learning. By further using the initial segmentation net method based on deep learning, the volume data segmenting function 12 generates the foreground probability map for the artery data and the foreground probability map for the vein data.

In FIG. 11, step S3' is a step executed as a result of the processing circuitry 10 invoking a program corresponding to the small tubular object data obtaining function 13 from the storage circuit 23. At step S3', the small tubular object data obtaining function 13 generates the foreground probability map for the artery/vein data, by joining together the two foreground probability maps generated at step S2'. The small tubular object data obtaining function 13 processes the foreground probability map by using the threshold value and obtains the foreground objects (the region) that fall in the predetermined threshold value range within the foreground probability map, as the small blood vessel data. The small tubular object data obtaining function 13 has thus obtained the small blood vessel data on the basis of the foreground probability map.

When the blood vessel (tubular object) segmentation is performed on the volume data by using the initial segmentation net method based on deep learning, the first modification example addresses the problem where the small blood vessels has lower contrast than the background and are not easily segmented. It is therefore possible to accurately detect the small blood vessels in a larger quantity and with more contiguity. It is therefore possible to avoid missing small blood vessels and misclassifying arteries/veins at the blood vessel peripheral ends.

Second Modification Example

Next, a second modification example of the present embodiment will be explained, with reference to FIG. 12.

In the second modification example, the tubular object data generating function 15 is configured to generate tubular object data according to an instruction from a user.

For example, to begin with, the tubular object data generating function 15 is configured to receive, from the user who referenced the base tubular object data displayed on the display 22, an instruction to select tubular object branch data related to one tubular object in the base tubular object data. In this situation, upon receipt of the instruction, the tubular object data generating function 15 is configured to cause the display 22 to display a plurality of pieces of small tubular object data, which are pieces of small tubular object data positioned adjacent to the tubular branch data. Subsequently, when the user selects a piece of small tubular object data that needs to be connected, from among the plurality of pieces of small tubular object data, the tubular object data generating function 15 is configured to generate the tubular object data by connecting the selected piece of small tubular object data to the tubular object branch data. After that, the data output function 16 is configured to cause the display 22 to display the tubular object data generated by the tubular object data generating function 15 as final tubular object data.

In the above example, the data output function 16 is configured to cause the display 22 to display the tubular object data generated by the tubular object data generating function 15 as the final tubular object data; however, possible embodiments are not limited to this example. For instance, the tubular object data generating function 15 may be configured, every time the base tubular object data is updated, to output the updated base tubular object data as interim tubular object data.

Processes performed by the small tubular object data selecting function 14 and the tubular object data generating function 15 according to the second modification example will specifically be explained by using an example of forming artery/vein data of the lung part.

After the small tubular object data obtaining function 13 detects the small blood vessel data of the lung part, the tubular object data generating function 15 is configured to cause the display 22 to display the base artery/vein data and to also receive an instruction indicating that the user selects one or more blood vessel branches from the base artery/vein data of the lung part. In this situation, when the tubular object data generating function 15 has received the instruction, the tubular object data generating function 15 is configured to cause the display 22 to display a plurality of small blood vessels positioned adjacent to the blood vessel branches selected by the instruction. On the basis of his/her experience, the user selects a small blood vessel to be connected to the blood vessel branches, from among the plurality of small blood vessels. In this situation, the tubular object data generating function 15 is configured to generate the artery data or the vein data, by connecting the small blood vessel selected by the user to a blood vessel branch of a corresponding artery or vein.

Next, processes (an image processing method) performed by the image processing apparatus 1 according to the second modification example will be explained, with reference to FIG. 12.

In the image processing method according to the second modification example, only steps S4" and S5" are different from the image processing method in the embodiment or the first modification example described above, while the other steps are the same. Thus, only steps S4" and S5" will be explained below.

In FIG. 12, step S4" is a step executed as a result of the processing circuitry 10 invoking a program corresponding to the tubular object data generating function 15 from the storage circuit 23. At step S4", in response to the user selecting one or more blood vessel branches in the base artery/vein data, the tubular object data generating function 15 causes the display 22 to display a plurality of small blood vessels positioned adjacent to the blood vessel branches.

In FIG. 12, step S5" is a step executed as a result of the processing circuitry 10 invoking a program corresponding to the tubular object data generating function 15 from the storage circuit 23. At step S5", on the basis of his/her experience, when the user selects a small blood vessel that needs to be connected, from among the plurality of small blood vessels, the tubular object data generating function 15 generates the artery data or the vein data, by connecting the small blood vessel selected by the user to a blood vessel branch of a corresponding artery or vein.

Further, in the second modification example, between step S3 and step S4", it is also acceptable to add the process at step S4 in the embodiment and the first modification example described above, i.e., the process of selecting from the small blood vessel data.

In the second modification example, when the blood vessel (tubular object) segmentation is performed on the volume data, it is possible to promptly generate Ground Truth (GT) of complete blood vessels and to accurately detect the small blood vessels. It is therefore possible to avoid missing small blood vessels and misclassifying arteries/veins at the blood vessel peripheral ends.

The constituent elements of the apparatuses in the above embodiments are based on functional concepts. Thus, it is not necessarily required to physically configure the constituent elements as indicated in the drawings. In other words, specific modes of distribution and integration of the apparatuses are not limited to those illustrated in the drawings. It is acceptable to functionally or physically distribute or integrate all or a part of the apparatuses in any arbitrary units, depending on various loads and the status of use. Further, all or an arbitrary part of the processing functions performed by the apparatuses may be realized by a CPU and a program analyzed and executed by the CPU or may be realized as hardware using wired logic.

Furthermore, it is possible to realize the image processing apparatus explained in the above embodiments, by causing a computer such as a personal computer or a workstation to execute a program prepared in advance. The program may be distributed via a network such as the Internet. Further, the program may be executed, as being recorded on a non-volatile computer-readable recording medium such as a hard disk, a flexible disk (FD), a Compact Disk Read-Only Memory (CD-ROM), a Magneto Optical (MO) disk, a Digital Versatile Disk (DVD), or the like and being read by a computer from the recording medium.

According to at least one aspect of the embodiments described above, it is possible to accurately segment the tubular objects.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processing apparatus, comprising:
   processing circuitry configured to:
   obtain volume data of a subject;
   obtain base tubular object data by segmenting the volume data;
   obtain small tubular object data from the volume data;
   generate updated base tubular object data, based on the small tubular object data and the base tubular object data; and
   output the updated base tubular object data,
   wherein the processing circuitry is further configured to obtain selected small tubular object data by eliminating a part that is shared in common with the base tubular object data, from the obtained small tubular object data.

2. The image processing apparatus according to claim 1, wherein the processing circuitry is further configured to generate the updated base tubular object data, by performing a contiguity analysis on the small tubular object data and the base tubular object data and connecting a certain part of small tubular object data satisfying a contiguity condition to the base tubular object data.

3. The image processing apparatus according to claim 2, wherein the processing circuitry is further configured to generate the updated base tubular object data, by performing a contiguity analysis on the small tubular object data and the base tubular object data, further obtaining first partial small tubular object data satisfying the contiguity condition from the small tubular object data, and connecting the obtained first partial small tubular object data to the base tubular object data.

4. The image processing apparatus according to claim 3, wherein the processing circuitry is further configured to repeatedly perform a process of generating the updated base tubular object data, by further performing a contiguity analysis on remaining small tubular object data that remains after eliminating the first partial small tubular object data from the small tubular object data and the updated base tubular object data, obtaining second partial small tubular object data satisfying the contiguity condition from the remaining small tubular object data, and connecting the obtained second partial small tubular object data to the updated base tubular object data.

5. The image processing apparatus according to claim 2, wherein the processing circuitry is further configured to repeatedly perform the process of generating the updated base tubular object data, until there is no longer small tubular object data to be connected to the updated base tubular object data.

6. The image processing apparatus according to claim 1, wherein the processing circuitry is further configured to obtain the selected small tubular object data, by eliminating tubular object data outside a threshold value range, from the obtained small tubular object data.

7. The image processing apparatus according to claim 1, wherein the processing circuitry is further configured to obtain the small tubular object data, by using a detection operator for a small-sized tubular object, based on a configuration of a small tubular object and a grayscale feature.

8. The image processing apparatus according to claim 7, wherein the processing circuitry is further configured to calculate an enhanced feature value in a Hessian matrix of the small-sized tubular object, as the detection operator.

9. The image processing apparatus according to claim 1, wherein the processing circuitry is further configured to:
   obtain the base tubular object data by segmenting the volume data through a learning process and further generate, through the learning process, a probability map regarding an object to be segmented; and
   obtain a region within a predetermined threshold value range in the probability map as the small tubular object data.

10. The image processing apparatus according to claim 1, wherein
   upon receipt of an instruction to select tubular object branch data related to one tubular object in the base tubular object data, from a user who referenced the base tubular object data displayed on a display, the processing circuitry is further configured to cause the display to display a plurality of pieces of small tubular object data, which are pieces of small tubular object data positioned adjacent to the tubular object branch data, and
   when the user selects a piece of small tubular object data that needs to be connected from among the plurality of pieces of small tubular object data, the processing circuitry is further configured to generate the updated base tubular object data, by connecting the selected piece of small tubular object data to the tubular object branch data.

11. The image processing apparatus according to claim 1, wherein the small tubular object data and the base tubular object data are each blood vessel data.

12. The image processing apparatus according to claim 11, wherein, the blood vessel data is vein blood vessel data and artery blood vessel data.

13. An image processing method, comprising:
   obtaining volume data of a subject;
   obtaining base tubular object data by segmenting the volume data;
   obtaining small tubular object data from the volume data;

generating updated base tubular object data, on a basis of the small tubular object data and the base tubular object data; and outputting the updated base tubular object data, wherein the method further comprises obtaining selected small tubular object data by eliminating a part that is shared in common with the base tubular object data, from the obtained small tubular object data.

14. A non-transitory computer-readable recording medium having recorded therein a program that causes a computer to execute processes of:

obtaining volume data of a subject;

obtaining base tubular object data by segmenting the volume data;

obtaining small tubular object data from the volume data;

generating updated base tubular object data, on a basis of the small tubular object data and the base tubular object data; and outputting the updated base tubular object data, wherein the method further comprises obtaining selected small tubular object data by eliminating a part that is shared in common with the base tubular object data, from the obtained small tubular object data.

* * * * *